Figure 1:
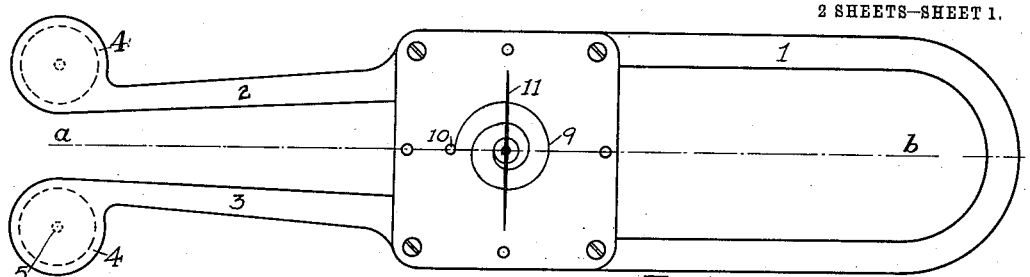

L. J. LE PONTOIS.
MAGNETIC TESTING DEVICE.
APPLICATION FILED MAY 13, 1908.

1,000,938.

Patented Aug. 15, 1911.

2 SHEETS—SHEET 1.

WITNESSES
Geo. N. Kerr.
E. O. Dubocq.

INVENTOR
Leon J. Le Pontois
BY
Edwards, Sager & Wooster.
his ATTORNEYS.

L. J. LE PONTOIS.
MAGNETIC TESTING DEVICE.
APPLICATION FILED MAY 13, 1908.

1,000,938.

Patented Aug. 15, 1911.

2 SHEETS—SHEET 2.

WITNESSES
Geo. N. Kerr
E. O. Duborg

INVENTOR
Leon J. Le Pontois
BY
Edwards, Sager & Wooster
his ATTORNEYS.

UNITED STATES PATENT OFFICE.

LEON J. LE PONTOIS, OF NEW ROCHELLE, NEW YORK, ASSIGNOR OF ONE-HALF TO BENJAMIN HURD, OF NUTLEY, NEW JERSEY.

MAGNETIC TESTING DEVICE.

1,000,938.            Specification of Letters Patent.     Patented Aug. 15, 1911.

Application filed May 13, 1908. Serial No. 432,681.

*To all whom it may concern:*

Be it known that I, LEON JULES LE PONTOIS, a citizen of the Republic of France, residing at New Rochelle, in the county of Westchester and State of New York, have invented certain new and useful Improvements in Magnetic Testing Devices, of which the following is a full, clear, and exact specification.

My invention relates to an improvement in means for determining the condition of material as regards its magnetic properties.

One application of my invention which is of particular importance, is in connection with the hardening of iron or steel, and for determining when the proper temperature of the iron or steel has been attained, before the sudden cooling for the purpose of hardening the iron or steel.

When it is desired to harden iron, or steel, the temperature is increased gradually to a certain degree and then suddenly cooled; and heretofore it has been necessary in practice in order to determine the proper maximum temperature to depend upon the color or colors assumed by the iron or steel. The determination of the proper temperature by this means is objectionable owing to the wide range in temperature which takes place with comparatively slight changes in color of the material. Furthermore, a person must have considerable training and experience in order to secure even approximately good results, and, even in the case of an experienced person, there is considerable difficulty in correctly determining by the eye the proper color of the iron at which the sudden cooling should occur. Also with different grades of iron and steel the color assumed by the material at the most desirable temperature for sudden cooling is not always the same which leads to further difficulty. Consequently even with persons of training and experience the old method results in considerable waste of material and loss of time. These difficulties are overcome by using my invention, and by the use of my improved apparatus the proper critical temperature of the iron may be easily and definitely determined even by a person without experience.

When iron or steel is gradually heated, a point is reached at which the iron or steel suddenly becomes non-magnetic and the temperature at which this occurs is known as the critical temperature. This temperature is the most desirable temperature which the iron or steel should have just before the sudden cooling, in order to secure the proper hardening of the material. This temperature varies in different grades of iron or steel, but always corresponds to the temperature at which the iron or steel suddenly becomes non-magnetic. Thus, if the critical temperature at which the material becomes non-magnetic is closely determined, then the most desirable temperature to which the material should be heated before sudden cooling is also accurately determined. By means of my invention the magnetic condition of the material is readily determined, thus affording accurate means for determining this critical temperature.

My invention will be understood by reference to the following description and accompanying drawings, in which—

Figure 2:
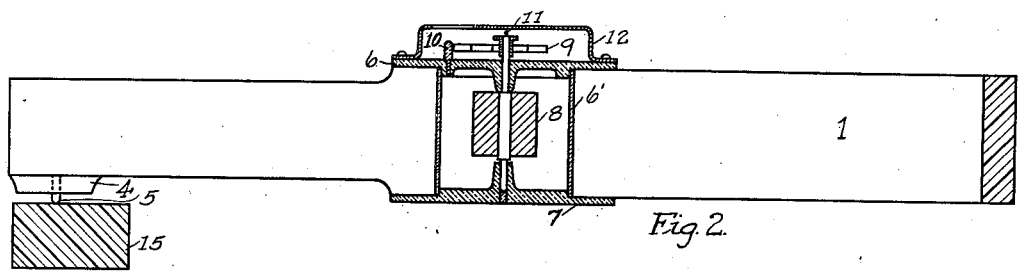
Figure 3:
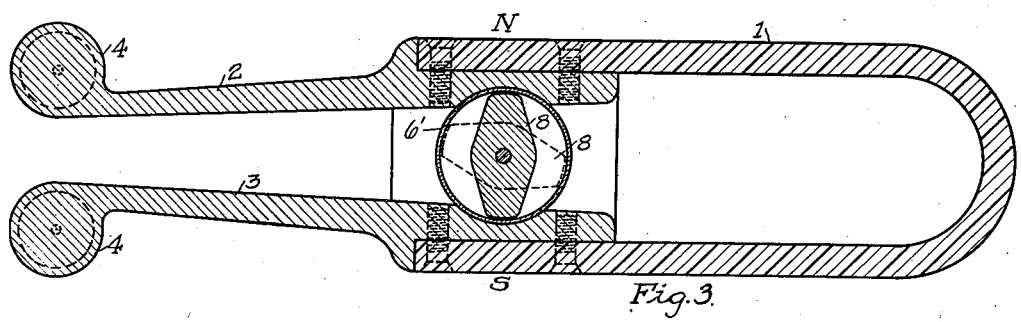
Figure 4:
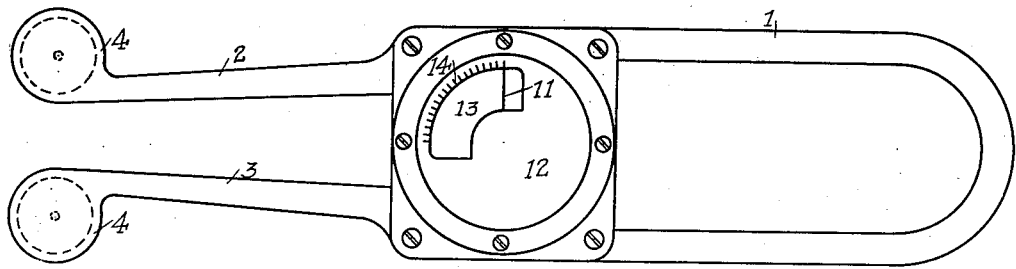
Figure 5:
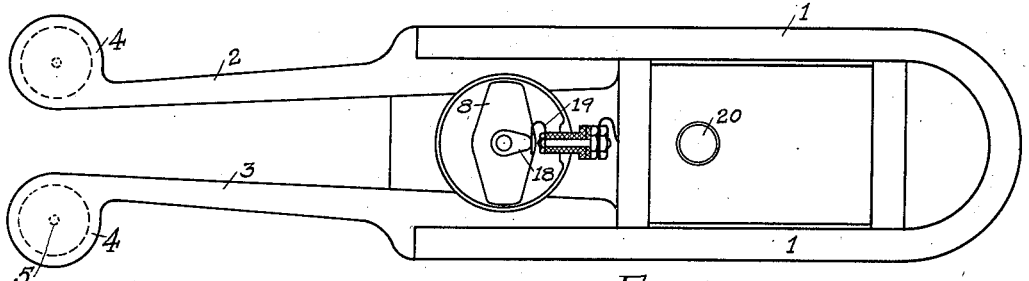
Figure 6:
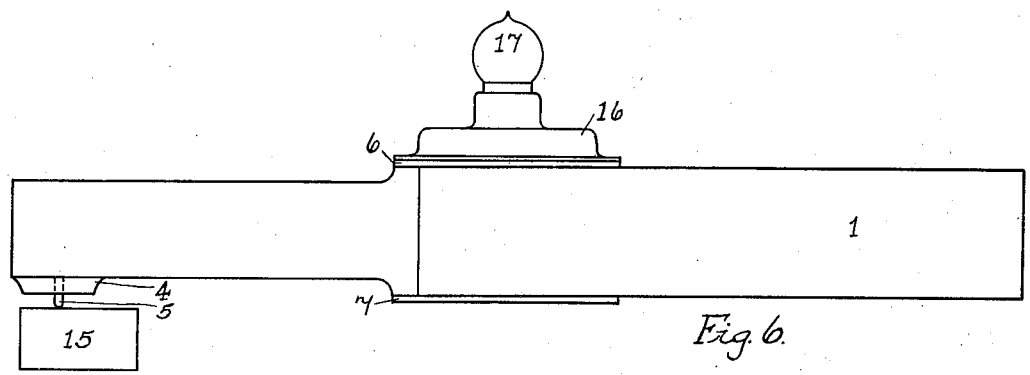
Figure 7:
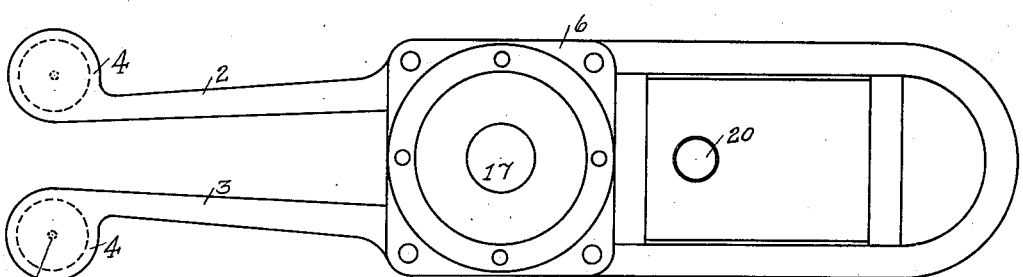
Figure 8:
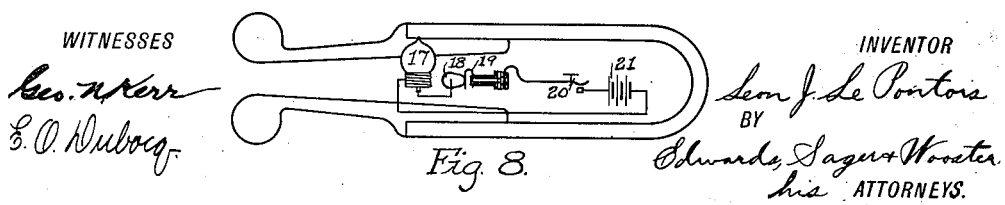

Figure 1 is a plan of one form of a device embodying my invention, with cover plate removed; Fig. 2 is a cross-section on the line $a$—$b$ of Fig. 1; Fig. 3 is a horizontal central cross section; Fig. 4 is a plan of the device with cover plate in position; Fig. 5 is a plan view of another form of my invention, with certain parts removed; Fig. 6 is a side view of the form shown in Fig. 5; Fig. 7 is a plan view of the form shown in Fig. 5, showing the device completely assembled, and Fig. 8 is a diagrammatic view showing the electrical connections of the form shown in Figs. 5 to 7.

Referring to the form shown in Figs. 1 to 4, a permanent magnet is shown at 1, which is provided with extensions 2, 3 of soft iron from each pole respectively. The extensions 2, 3 are each provided with an enlarged portion 4, which has a projecting flat lower portion, as shown in Fig. 2. These lower surfaces are each provided with a small projecting portion 5, which may preferably be of silicon, or other suitable material having a high point of fusion and low heat conductivity. Between the two poles of the permanent magnet is pivotally mounted, in suitable non-magnetic cover plates 6, 7 the armature of soft iron. The armature 8 is fixed to its supporting shaft. To the end of the shaft which projects beyond the plate 6 is secured a spiral spring 9, the other end of which is fastened to the fixed support 10, mounted on the plate 6.

The spring 9 tends to swing the armature 8 to the position shown in dotted lines in Fig. 3, thus acting in opposition to the influence of the permanent magnet upon the armature 8, which tends to hold the armature in the position shown in full lines in Fig. 3. Fixed to the upper end of the shaft of the armature 8 is a pointer 11 which extends in the same direction as the armature 8. Over the pointer 11 and spring 9 is placed a cover plate 12, having an opening 13, through which the pointer 11 may be seen. The opening 13 may be provided with a scale 14 if desired, from the reading of which the magnetic condition of the material tested may be determined. The armature 8 is protected by being inclosed in a cylindrical non-magnetic frame 6'.

In the operation of the device, the armature 8 will normally take the position shown in full lines in Fig. 3, being held in such position by the magnetic influence of the poles N, S of the permanent magnet and against the force exerted by the spring 9. In testing the magnetic properties of any material, such as 15, the faces of the enlarged portions 4, 4 will be placed over the material so that the points 5, 5 will make contact therewith. As the faces of the enlarged portions 4, 4 are of considerable area, the reluctance of the gaps between such faces and the material to be tested, is comparatively small, and a path is afforded for the magnetism of the permanent magnet from the pole N, through the extension 2, to and through the material to be tested, and back through the extension 3, to the other pole of the magnet. If the material tested be magnetic, the magnetic flux will follow through the magnetic path last referred to, and will not pass through the armature 8 to any appreciable extent, and this shunting of the magnetism from the armature will, therefore, cause the same to assume a position approximately such as shown in dotted lines in Fig. 3, by reason of the force exerted by the spring 9. A deflection of the pointer 11 from its normal position will be observed by the operator, and if deflected approximately the full amount of 90° it will be evident that the material tested is magnetic material. If the pointer is deflected only partially, the degree of deflection will indicate the degree to which the material to be tested possesses magnetic properties. If the material tested be non-magnetic, this will be shown by there being no appreciable deflection of the pointer 11.

In determining the critical temperature of iron or steel in the process of hardening, as the temperature of the iron or steel is gradually raised, the operator will apply the device to the heated iron or steel as above referred to, and if the armature be deflected, the operator will know that the material is still in a magnetic state and requires further heating. As the temperature is further increased the operator will apply the device from time to time and when no deflection of the armature occurs, it will be apparent that the iron or steel has been heated to such a temperature that it becomes non-magnetic and that the critical temperature has been attained. The material will then be suddenly cooled in the usual manner for the purpose of hardening.

The projecting points are provided for the purpose of securing a slight separation of the testing device from the steel in order not to abstract from the heated steel any appreciable amount of heat and unnecessarily cool the same. In some cases it will be desirable to heat the material to a temperature known to be above the critical temperature and then withdraw from the furnace and allow to cool slowly until the critical temperature is reached, when the material will then be suddenly cooled. In such cases my improved device will be applied to the material which is then non-magnetic upon removal from the furnace and while cooling slowly, and when my device indicates that the material has become magnetic showing the existence of the critical temperature, the material will then be suddenly cooled. This method avoids testing of the material while in the furnace or repeated withdrawals from the furnace and may be preferable where the material is heated in such manner that it cannot be conveniently tested during the process of heating.

In the form shown in Figs. 5, 6 and 7, instead of using a deflecting needle, for the purpose of indicating the magnetic condition of the material tested, I have provided means in the form of an incandescent lamp for indicating the condition of the material. The parts indicated by the same reference characters in these figures, correspond to the same parts in Figs. 1 to 4. Over the upper plate 6, which supports the armature 8, I mount a support 16 for a small incandescent lamp 17. The shaft of the armature 8 is provided with a projecting cam 18, adapted to make and break contact with a flexible fixed contact 19, which is insulated from the frame of the device and connected through a switch 20 of any suitable form to a source of supply, such as a battery 21 inclosed within the permanent magnets, or connected to some outside source of electricity. The circuit connections are shown in Fig. 8, and pass from one terminal of the source or battery 21 through the switch 20 to the flexible contact 19, to the cam 18, thence through the shaft of the armature 8 and supporting parts of one terminal of the lamp 17, and thence through the lamp back to the other terminal of the source 21.

In operation, the magnetic attraction of the armature 8 causes the armature to assume the normal position shown in Fig. 5, the cam 18 making connection with the contact 19, and when the operator closes the switch 20, current will be supplied to the lamp. When the device is applied to the material to be tested, as above referred to, if the material be magnetic, the armature 8 will be deflected as above explained, and the cam 18 will interrupt the circuit through the lamp. On the other hand, if the material to be tested be non-magnetic, the armature 8 will not be deflected appreciably and the lamp circuit will not be interrupted. Thus, if the lamp continues to burn, it will be apparent that the material is in a non-magnetic state, whereas if the lamp is extinguished, it will be apparent to the operator that the material is still magnetic.

Various other forms of my invention may be developed without departing from the scope thereof, and, although I have referred particularly to the use of my invention in connection with determining the critical temperature of iron and steel in the process of hardening, yet various other applications thereof may be made.

Having thus described my invention, I declare that what I claim as new and desire to secure by Letters Patent, is,—

1. In a device for testing the magnetism of an object, the combination of a magnet, a movable device in magnetic relation to the poles of said magnet, said poles having extensions of magnetic material having at their outer ends portions of comparatively large surface area, and relatively small projecting portions at said outer ends.

2. In a testing device of the character described, the combination of a magnet, a movable device between the poles of said magnet, said magnet having extensions beyond said device, and means for insuring an air gap between the surfaces of said extensions and the material to be tested.

3. In a testing device of the character described, the combination of a magnet, a movable device between the poles of said magnet, said magnet having extensions beyond said device and said extensions having comparatively large surface areas to be applied over the material to be tested, and means for insuring an air gap between said areas and said material.

4. In a device for testing the magnetism of a heated object, the combination of a magnet, a movable device in magnetic relation to the poles of said magnet, yieldable means for restraining the movement of said device, said poles having extensions of magnetic material whose outer ends are of comparatively large area, and portions of refractory material of low heat conductivity at one or more of said outer ends.

In testimony whereof I affix my signature, in presence of two witnesses.

LEON J. LE PONTOIS.

Witnesses:
L. K. SAGER,
GEO. A. HOFFMAN.